Patented Dec. 18, 1945

2,391,270

UNITED STATES PATENT OFFICE 2,391,270

PROCESS FOR THE SEPARATION OF ISOQUINOLINE

Frederick E. Reimers, Rahway, N. J., assignor to Allied Chemical & Dye Corporation, New York, N. Y., a corporation of New York No Drawing. Application July 8, 1943, Serial No. 493,923

7 Claims. (Cl. 260—283)

This invention relates to the separation of isoquinoline from mixtures thereof with other nitrogen bases.

Pyridine, quinoline, isoquinoline and their homologs are customarily extracted along with other nitrogen bases from coke-oven distillates and other sources of heterocyclic nitrogen bases by means of an aqueous solution of a mineral acid, usually sulfuric acid. After liberation from these acid solutions by means of alkali, the base mixtures thus obtained are customarily fractionally distilled to obtain fractions predominating in a particular base. Isoquinoline fractions may thus be obtained, and fractions are generally taken which boil predominantly within the range of 241°–245° C. However, these fractions may vary in isoquinoline content from a few percent to about 80%, the remainder consisting of other nitrogen bases of boiling range close to isoquinoline and not readily separable therefrom by distillation, e. g., quinoline, quinaldine, alkyl pyridines such as tetramethyl pyridines and primary aromatic amines such as cumidines. Mixtures of this kind have found limited practical application and are of relatively low economic value. Pure isoquinoline, however, is a product of considerable commercial interest, being useful, for example, in the preparation of pharmaceutical products and dyes. The purity requirements in these fields are rigid.

As above indicated, the bases present with isoquinoline in its commercial fractions are not readily separable from the isoquinoline by fractional distillation. No description of a practical method for separating these closely related compounds has been found in the literaure in this field. In the case of various base mixtures, methods usually depending upon fractional crystallization of the more common salts of the bases present, e. g., sulfates, chlorates, etc., have been proposed. However, as above stated, for the separation of reasonably pure isoquinoline from such closely related nitrogen bases as quinoline, quinaldine, close-boiling pyridine homologs and close-boiling aromatic amines, no practical methods have heretofore been disclosed in the published prior art.

It is an object of this invention to provide a process for separating pure isoquinoline from mixtures thereof with closely related nitrogen bases not readily separable therefrom by distillation.

It is a further object of this invention to provide a commercially feasible process for isolating pure isoquinoline or fractions enriched in isoquinoline from the usual commercial isoquinoline fractions, particularly from tar-base fractions boiling predominantly within the range of about 241° to 245° C., containing, in addition to isoquinoline, quinoline and quinaldine.

I have discovered that substantially pure isoquinoline or a fraction enriched in isoquinoline may be isolated from a mixture containing isoquinoline and the other nitrogen bases with which the isoquinoline is generally associated, e. g. quinoline, quinaldine, close-boiling pyridine homologs and primary aromatic amines, by precipitating the isoquinoline or an isoquinoline-enriched fraction from the mixture in the form of its calcium chloride addition compound. I have found that the calcium chloride addition compound of isoquinoline, in which two molecules of isoquinoline are combined with one molecule of calcium chloride, is substantially less soluble in a nitrogen base mixture or in solvents such as hydrocarbons or alcohols than are calcium chloride addition compounds of quinoline, quinaldine, and the other bases generally associated with isoquinoline. This is particularly surprising since isoquinoline and the other bases generally associated therewith, such as quinoline and quinaldine, have heretofore been thought to form addition compounds of substantially identical properties.

My invention may further comprise a process in which a nitrogen base mixture containing isoquinoline and a number of other nitrogen bases, e. g., the usual nitrogen base mixture recovered from coal tar, is first fractionated to obtain a fraction containing a substantial amount of isoquinoline along with the close-boiling bases generally associated with isoquinoline, and pure isoquinoline or an isoquinoline-enriched fraction is then separated from the distillate fraction in the form of its calcium chloride addition compound. Such a distillate fraction, as above stated, generally contains quinoline and quinaldine in substantial proportions, and may also contain pyridine homologs and primary aromatic amines boiling close to isoquinoline. In the specification and claims, the expression "like-boiling" nitrogen bases, with reference to isoquinoline, is used to denote these nitrogen bases, e. g., quinoline and quinaldine, not readily separable from isoquinoline by distillation, either because of their close boiling points or because of the formation of azeotropic mixtures.

The process of my invention may advantageously be applied to nitrogen base mixtures containing from a few percent of isoquinoline to major proportions of isoquinoline, obtained from coke-oven distillates, cracked petroleum, and other natural as well as synthetic sources of isoquinoline admixed with like-boiling bases. As above pointed out, in carrying out the process of my invention it may be advantageous first to subject such a mixture to fractional distillation to obtain a close-cut fraction containing predominantly isoquinoline and like-boiling bases.

When a mixture of isoquinoline and like-boiling bases contains 35% or more of isoquinoline, substantially pure isoquinoline may be isolated directly by a single precipitation with calcium chloride, in accordance with my invention, as illustrated in Examples 1 to 4 below. From a base mixture of less than 35% isoquinoline content a product enriched in isoquinoline may be obtained, and this enriched material may be again treated with calcium chloride to yield an isoquinoline product of 98% to 100% purity. The production of an isoquinoline-enriched material from a base mixture low in isoquinoline is illustrated in Example 5 below.

In carrying out the process of my invention, an isoquinoline mixture, as above described, is treated with calcium chloride, either in the form of an aqueous solution or in the form of a dry salt, to precipitate the calcium chloride addition compound of isoquinoline which, as above stated, consists of two molecules of isoquinoline combined with one of calcium chloride. The use of an aqueous solution of calcium chloride, I have found, is generally more advantageous than the dry salt for reaction with the isoquinoline to give a crystalline product that may be readily separated from the mother liquor. A dilute solution of calcium chloride will precipitate a smaller quantity of the isoquinoline addition compound than a concentrated solution; however, the material precipitated by a dilute solution may be more nearly 100% pure isoquinoline addition product. I have found it generally advantageous to employ a relatively concentrated solution of calcium chloride, preferably a substantially saturated solution.

It may also be advantageous for ease in handling the mass to add a diluent such as an alcohol or a hydrocarbon solvent; e. g., methanol, ethanol, toluene, or any one of various fractions of petroleum hydrocarbons of such boiling ranges as 90°–125° C., 120°–150° C. or 130°–180° C. When an alcohol or other solvent in which the calcium chloride addition compound of isoquinoline tends to be soluble is employed, the amount of solvent used should be suitably limited, e. g. by distilling off the bulk of the solvent before filtration, so as to obtain a precipitate of the isoquinoline-calcium chloride addition compound in good quantity.

Distillation may also be advantageous when a relatively dilute aqueous solution of calcium chloride is used as reagent. In this case the excess water may be removed by azeotropic distillation, which involves refluxing the mixture and passing the reflux condensate through a side-arm trap where the lower water layer may be removed while the upper oil layer (e. g., composed of the hydrocarbon solvent) is returned to the still.

The isoquinoline may be precipitated in the form of its calcium chloride addition compound in a single precipitation or in a number of stages. The latter procedure is particularly advantageous in treating a crude of high isoquinoline content to avoid working with a voluminous precipitate that can be separated and washed only with difficulty. Precipitation in stages is illustrated in Example 1 below. In either case, the total amount of calcium chloride employed should preferably be slightly more than the amount of isoquinoline present on a mol-to-mol basis; i. e., the amount of calcium chloride represents somewhat more than 100% excess over that required to react with the isoquinoline present.

In a preferred method of carrying out the process of my invention, a mixture of approximately equal parts by volume of isoquinoline and toluene (or other solvent, as above stated) is prepared. Into this is stirred a saturated aqueous solution of calcium chloride containing an excess over the quantity equivalent to the amount of isoquinoline present on a mol-to-mol basis. The mixture is stirred for a short time and filtered or centrifuged. The addition compound is washed with a small quantity of solvent. If brownish or yellowish in color, reslurrying in solvent may be desirable to remove occluded bases.

The separated addition compound is slurried in water to decompose the addition compound into isoquinoline and calcium chloride. The isoquinoline separates as an upper layer and the calcium chloride is largely present in the lower aqueous layer. After separation, the liberated isoquinoline is water-washed to remove small amounts of dissolved calcium chloride and is then distilled to remove small quantities of solvent and water. To obtain a water-white product, the isoquinoline is straight-distilled and the fraction boiling in the range 242° to 243° C. is taken as product. This product is generally of 98% to 100% purity. Any foreruns boiling below 242° C. may be dried with flake sodium hydroxide or a concentrated sodium hydroxide solution, and the dried material then returned to the still.

The calcium chloride solution from the liberation of isoquinoline may be brought to the desired concentration for reuse to precipitate a new batch of isoquinoline by evaporation or by addition of dry calcium chloride.

The above process may also advantageously be carried out by adding only one-half to one-third the indicated amount of calcium chloride, otherwise proceeding as above. The mother liquor from the above precipitation of isoquinoline addition compounds may then be treated with additional calcium chloride to precipitate more of the isoquinoline addition compound which may then be separated and converted to isoquinoline, as above described. This may be continued until the indicated total amount of calcium chloride has been employed.

When the mother liquor (or the initial isoquinoline crude) contains only a low percentage of isoquinoline, it may still be advantageous to precipitate the calcium chloride addition compound of isoquinoline. The product in this case may be only an enriched isoquinoline fraction rather than pure isoquinoline. This product, however, may again be treated with calcium chloride in accordance with the process of the invention to obtain a pure isoquinoline product.

When precipitation of isoquinoline has been carried out to such an extent that it is no longer desired to treat the mother liquor for further recovery of isoquinoline, the mother liquor and the wash liquor from the precipitation of the calcium chloride addition compound of isoquinoline may be treated to separate solvent, either by distillation or by extraction of the nitrogen bases contained therein with sulfuric acid.

When an alcohol is used as diluent for precipitation of the isoquinoline addition compound, as above pointed out, the bulk of the alcohol should be distilled off in order to bring about substantially complete precipitation of the addition compound. In this case, after filtration of the addition compound, a hydrocarbon solvent may be used to wash the product.

The following examples are illustrative of the process of my invention:

EXAMPLE 1

*Addition of aqueous calcium chloride to a hydrocarbon solvent-isoquinoline fraction mixture (three precipitations)*

The material used in this example consisted of a mixture of heterocyclic bases containing approximately 80% of isoquinoline and 20% of quinoline and quinaldine. The material had a limpid point of 18° C. and distilled over a range of 241°–248° C.

An enameled pot equipped for agitation was charged with 3000 parts by weight of the base and 2000 parts by weight of toluene. To this was slowly added with stirring 2600 parts by weight of saturated aqueous calcium chloride solution containing 1350 parts by weight of calcium chloride. Crystallization started almost immediately and was accompanied by a rise in temperature to approximately 65° C. The mixture was agitated for one hour and cooled to room temperature. The mixture was filtered on a suction filter and the fairly dry crystals were washed with 300 parts by volume of toluene. The crystals of calcium chloride-isoquinoline addition compound were resludged in 2500 parts by volume of toluene to remove occluded impurities, filtered and washed with small portions of toluene.

The crystals of addition compound were dried over night to remove toluene and then dissolved in 1750 parts by weight of water. Two layers were formed: an upper layer of isoquinoline and a lower layer of aqueous calcium chloride solution. The base layer, after dehydration and distillation, amounted to 749 parts by weight. The melting point was 25.7° C.; purity 98–100%.

The mother liquor after removal of the addition compound by filtration was recharged to the enameled pot and 1600 parts by weight of saturated aqueous calcium chloride solution containing 835 parts by weight of calcium chloride were added with agitation. Since a very heavy precipitate had formed, 500 parts by volume of toluene wash (from washing the first precipitate) were added to form a workable slurry. The mixture was filtered and the filtered crystals were reslurried in 1000 parts by volume of the reslurrying solvent from reslurrying the first precipitate.

The filtered crystals were dried and dissolved in 200 parts of water. After dehydration and distillation of the liberated base, 215 parts by weight of isoquinoline were obtained. Purity was 98–100%.

The mother liquor from the second extraction was returned with 1000 parts by weight of saturated calcium chloride solution. After purification with solvent and drying, the addition compound yielded 81 parts by weight of isoquinoline of 98% purity.

The total of the three precipitations amounted to 1045 parts by weight or 35% by weight of the originally charged tar-base mixture. This amounts to 44% of the isoquinoline originally present.

Except for the first precipitation, the calcium chloride used was recovered material brought to the saturation concentration by addition of dry calcium chloride.

EXAMPLE 2

*Addition of aqueous calcium chloride to a hydrocarbon solvent-isoquinoline fraction mixture (single precipitation)*

An enameled pot equipped for agitation was charged with a mixture consisting of 1000 parts by weight of the same isoquinoline fraction described in Example 1 and 650 parts by volume of toluene. Into this was stirred 1400 parts by weight of a saturated aqueous calcium chloride solution containing 725 parts by weight of the salt. The mixture, after precipitation was completed, was agitated and cooled to room temperature. The precipitate was filtered, resludged in toluene, refiltered and dried at 85° C.

The base was liberated from the addition compound in the same manner as described in Example 1. The yield of dry distilled base was 301 parts by weight. The purity was 98% (melting point, 25.2°).

The mother liquor and toluene washes were extracted with 40% sulfuric acid and the bases liberated by neutralization with sodium hydroxide. The dehydrated and distilled recovered bases amounted to 577 parts by weight. Total recovery of bases (including pure isoquinoline) amounted to 878 parts by weight; 87.8% of the originally charged isoquinoline fraction.

EXAMPLE 3

*Addition of calcium chloride solution to an isoquinoline fraction*

420 parts by weight of saturated aqueous calcium chloride solution were added with agitation to 200 parts by weight of an isoquinoline fraction estimated to contain approximately 65% by weight of isoquinoline. The precipitate, after cooling the mixture to room temperature, was filtered and washed with small portions of toluene. It was then reslurried in 400 volume parts of toluene, refiltered, washed with toluene, and dried.

The crystals were dissolved in water and the base separated, dehydrated, and distilled. The yield was 74 parts by weight of isoquinoline having a purity of 94–95%.

EXAMPLE 4

*Addition of dry calcium chloride to a mixture of isoquinoline fraction and xylene*

250 parts by weight of dry powdered calcium chloride were stirred into a mixture of 500 parts by weight of isoquinoline fraction, estimated to contain 55% of isoquinoline, and 430 parts by weight of xylene. The entire mixture was agitated and heated to 100° C., at which point the mixture thickened considerably and 220 parts by weight of xylene were added to thin the slurry. The mixture was heated to 120–130° C. and kept at that temperature for 2 hours. After cooling to 45–50° C., the material was filtered and the crystals washed with toluene and dried.

The dry crystals were dissolved in 350 parts by weight of water and the separated base was dried and distilled. The yield of isoquinoline was 82 parts by weight. This corresponds to 30% of the isoquinoline in the crude charged. The purity was 95%.

EXAMPLE 5

Boosting a crude to a higher isoquinoline concentration

The material used in this experiment contained 30% by weight of isoquinoline and approximately 70% by weight of quinoline and quinaldine.

450 parts by weight of this isoquinoline fraction were heated to 80° C. and charged to an enameled pot equipped for agitation. To this was added with agitation at 120° C. a solution of 580 parts by weight of calcium chloride in 520 parts of water. The pot temperature was maintained for one-half hour. The heavy crystal slurry was cooled to 55-60° C. and filtered. The crystals were suspended in toluene, refiltered, and washed with toluene.

The bases liberated from these crystals, dried and distilled, amounted to 150 parts by weight. They were found to contain about 70% isoquinoline, or about 78% of the isoquinoline content of the crude starting mixture. A pure isoquinoline product could be obtained by treating this 70% product again by the process of the invention.

Since certain changes may be made in carrying out the above process without departing from the scope of the invention, it is intended that all matter contained in the above description shall be interpreted as illustrative and not in a limiting sense.

What is claimed is:

1. In a process for separating a product enriched in isoquinoline from a mixture containing this base and like-boiling nitrogen bases, the step which comprises precipitating from said mixture the calcium chloride addition compound of isoquinoline, and separating the precipitated material.

2. In a process for separating isoquinoline from a mixture containing this base and like-boiling nitrogen bases, the steps which comprise precipitating isoquinoline from such mixture in the form of its calcium chloride addition compound, and separating the precipitated addition compound.

3. In a process for separating isoquinoline from a mixture containing this base and like-boiling nitrogen bases, the steps which comprise precipitating isoquinoline from such mixture in the form of its calcium chloride addition compound, separating the precipitated addition compound and liberating isoquinoline therefrom.

4. In a process for separating a product enriched in isoquinoline from a mixture containing this base and like-boiling nitrogen bases, the steps which comprise treating the mixture with calcium chloride in the presence of a diluent to precipitate the calcium chloride addition compound of isoquinoline, and separating the precipitated material.

5. In a process for separating substantially pure isoquinoline from a mixture containing this base and like-boiling nitrogen bases, isoquinoline constituting at least about 35% of the base mixture, the steps which comprise treating said mixture with calcium chloride to precipitate the calcium chloride addition compound of isoquinoline, separating the precipitated addition compound and treating it to liberate substantially pure isoquinoline.

6. In a process for separating a product enriched in isoquinoline from a mixture containing this base and like-boiling nitrogen bases, the steps which comprise fractionally distilling the mixture to obtain a distillate fraction containing a substantial proportion of isoquinoline along with like-boiling nitrogen bases, treating this fraction with calcium chloride to precipitate the calcium chloride addition compound of isoquinoline, separating the precipitated material and treating it to liberate the product enriched in isoquinoline.

7. In a process for separating a product enriched in isoquinoline from a mixture containing this base and like-boiling nitrogen bases, the steps which comprise treating said mixture with an amount of calcium chloride slightly in excess of the isoquinoline present on a mol-to-mol basis, in the presence of a hydrocarbon diluent, the calcium chloride being employed in the form of a saturated aqueous solution, to precipitate the calcium chloride addition compound of isoquinoline, separating the precipitated material and treating it with water to liberate the product enriched in isoquinoline.

FREDERICK E. REIMERS.